United States Patent [19]

Tims et al.

[11] 3,947,802

[45] Mar. 30, 1976

[54] OMNIDIRECTIONAL LOW NOISE PIEZOELECTRIC TRANSDUCER

[75] Inventors: Allan C. Tims; Theodore A. Henriquez, both of Orlando, Fla.

[73] Assignee: The United States of America as represented by the Secretary of the Navy, Washington, D.C.

[22] Filed: June 12, 1972

[21] Appl. No.: 261,861

[52] U.S. Cl. .................................. 340/10; 340/12 R
[51] Int. Cl.² .......................................... H04B 13/00
[58] Field of Search ........................ 340/8, 10, 9, 12

[56] References Cited

UNITED STATES PATENTS

| | | | |
|---|---|---|---|
| 2,725,219 | 11/1955 | Firth | 340/10 UX |
| 3,217,288 | 11/1965 | Sims | 340/10 |
| 3,263,210 | 7/1966 | Schloss | 340/10 |

*Primary Examiner*—Samuel Feinberg
*Assistant Examiner*—Harold Tudor
*Attorney, Agent, or Firm*—R. S. Sciascia; Arthur L. Branning; James D. Frew

[57] ABSTRACT

A piezoelectric ceramic transducer assembly for broadband noise-measuring hydrophone. A longitudinally polarized lead zirconate-titanate cylinder provided with end caps is sealed by O-rings within a circumferentially polarized lead zirconate-titanate cylinder providing high sensitivity, smooth response, omnidirectionality, and stability with temperature and hydrostatic pressure variations.

2 Claims, 3 Drawing Figures

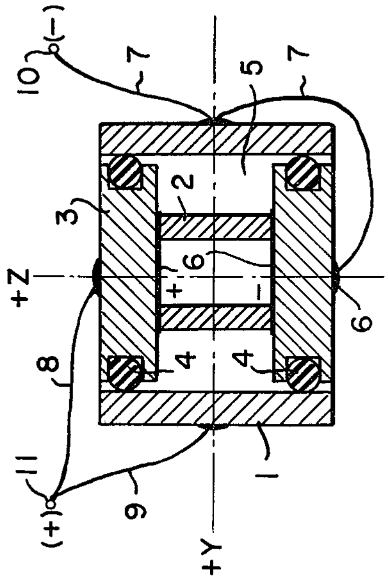
FIG. 1.
FIG. 2.
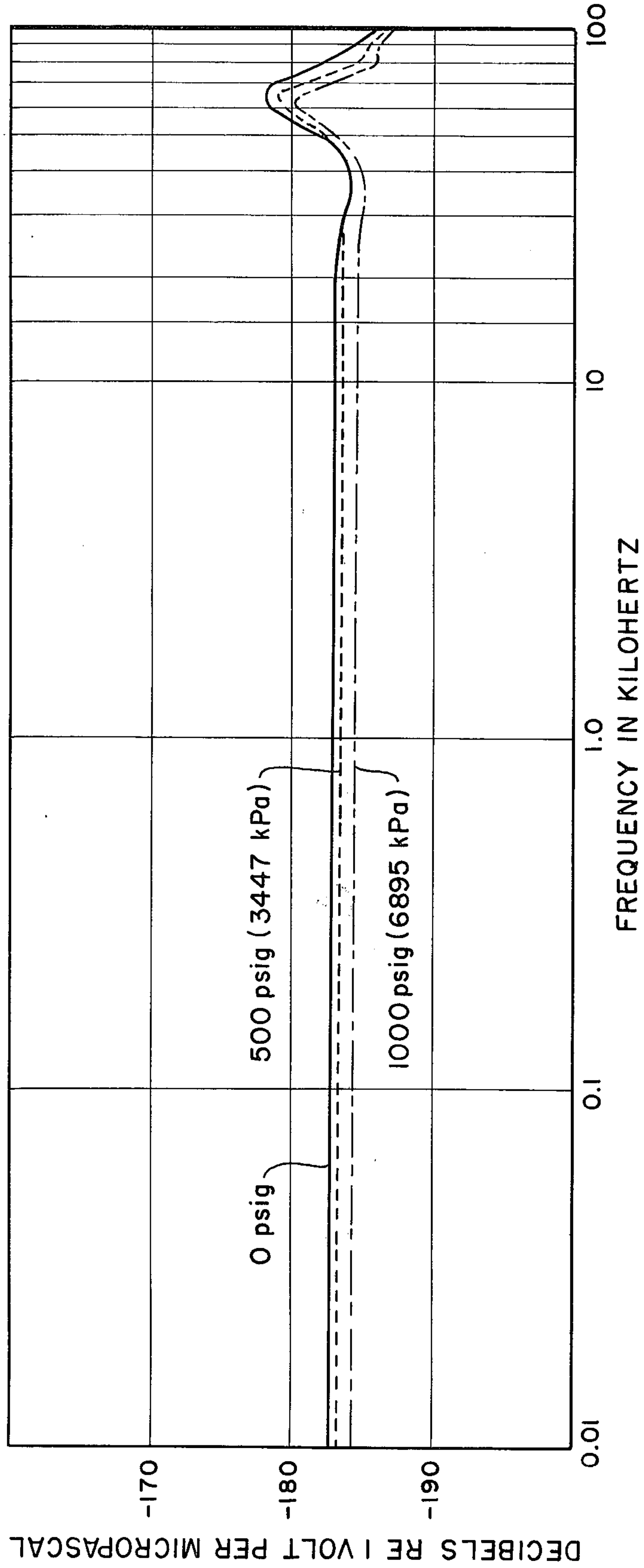

OMNIDIRECTIONAL LOW NOISE PIEZOELECTRIC TRANSDUCER

BACKGROUND OF THE INVENTION

Considering the current interest in the exploration of the sea, a need has come about for more sophisticated underwater monitoring equipment. Specifically, there has been a long felt requirement for an omnidirectional hydrophone capable of braodband noise measurement while having a self-noise level of at least 10 dB below that of sea state zero.

The heart of the hydrophone is the sensing transducer, and therefore the sensitivity of the hydrophone essentially depends upon the particular construction of the transducer.

Artificial piezoelectric materials such as barium titanates, lead zirconates, etc. provide an excellent sensing material and have greatly advanced the studies in underwater research.

Many techniques of assembling the piezoelectric sensor have resulted in the increased sensitivity however, the present invention further advances the sensitivity by using two crystals, each supporting the other, so that both crystals are exposed to the same acoustic pressure.

The present state of the art of hydrophone low-noise preamplifiers requires that the open-circuit voltage level of a piezoelectric transducer be in the range of −185 to 180 dB re 1 volt per micropascal -85 to -80 dB re 1 volt per microbar) to enable the self-noise level of the total hydrophone to be sufficiently low.

SUMMARY OF THE INVENTION

An improved piezoelectric ceramic transducer assembly for a broad-band noise-measuring hydrophone. A longitudinally polarized lead zirconate-titanate tube provided with end caps is sealed by O-rings within a circumferentially polarized lead zirconate-titanate cylinder. The arrangement provides high sensitivity and smooth response to 100 kHz; omnidirectionality to 60 kHz and stability with temperature and pressure.

OBJECT OF THE INVENTION

It is therefore an object of the present invention to provide an improved transducer for use in broad-band noise-measuring hydrophones.

Another object is to provide a transducer which is useful in low noise measurement.

Yet another object is to provide a transducer with high sensitivity, smooth response, omnidirectionality, and stability with temperature and hydrostatic pressure.

While still another object is to provide a dual element hydrophone with an improved frequency range.

DRAWINGS

FIG. 1 illustrates a side view of the transducer assembly.

FIG. 2 illustrates a typical free-field voltage sensitivity of the transducer.

DESCRIPTION OF THE PREFERRED EMBODIMENT

Figure 3:
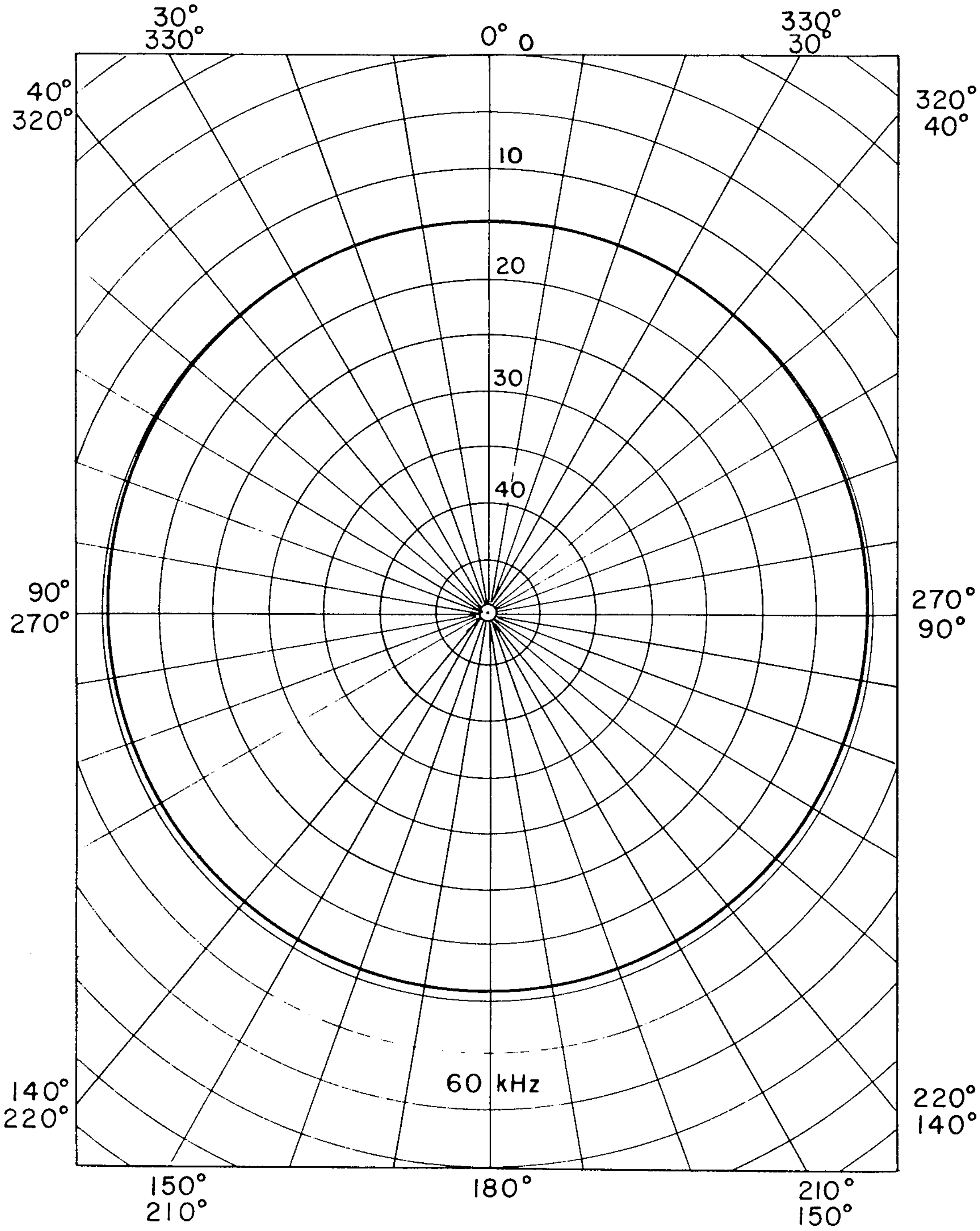
FIG. 3 illustrates a typical directivity pattern in the XY (Horizontal) plane.

Referring now to FIG. 1 which shows a sectional side view of the transducer assembly, the transducer assembly consists of two concentrically mounted piezoelectric elements in a unique configuration. A circumferentially polarized lead zirconate-titanate ceramic cylinder 1 serves as one element and also as the housing for a longitudinally polarized lead zirconate-titanate cylinder 2 that supports diaphragms 3 which are sealed in the ceramic cylinder as well as tubular in shape as shown. Further the cylinder 1 may have metallic rings attached thereto to provide improved sealing by O-rings 4 (as shown in copending application to same inventors, U.S. application Ser. No. 256,864, now U.S. Pat. No. 3,827,023.

The air 5 hermetically sealed within the transducer isolates the inner surfaces of the cylinder 1 and 2 from the sound field. This arrangement yields the maximum available sensitivity from each element. The smooth response in sensitivity of the hydrophone is the result of combining the sensitivity of the individual elements. The circumferentially polarized cylinder 1 operates in the end-exposed mode which is not the case in the prior art transducers where the end conditions vary with pressure while cylinder 2 operates in the end-capped mode. The method of construction does not require the use of pressure release materials. The diaphragms 3 are secured to the ends of cylinder 2 by conducting adhesive 6.

Cylinders 1 and 2 are wired electrically in parallel for example as shown wire 7 is conductively epoxyed to the negative diaphragm and to the negative connections of cylinder 1 to connect the end of cylinder 2 to the negative connections of cylinder 1. Wire 8 is epoxyed to the positive diaphragm of cylinder 2 and connected to wire 9 which has been epoxyed to the positive connections of cylinder 1. The elements could of course also be connected in series which would increase the impedance while giving greater sensitivity.

Thus it is seen that there has been invented a transducer which employs two cylindrical piezoelectric elements, the inner element being longitudinally polarized and provided with end caps. The inner element and its end caps are concentrically mounted within the second element which circumferentially polarized. The mounting of the inner cylinder and end caps within the outer cylinder allows the outer cylinder to operte in the end exposed mode and the outer cylinder thereby is relatively uneffected by the changing end conditions which would occur as operating pressures increased.

It has been found that the ratios of the areas of the diaphragms 3 to that of the end cross section of the cylinder 2 is 4 to 1, which provide a 12 dB increase in sensitivity. Cylinder 2 supports the diaphragms 3 in such a manner that extraneous flexures resonances of the diaphragms within the design frequency range are eliminated.

FIG. 2, shows the open circuit voltage at the transducer output terminals 10 and 11. The free-field sensitivity is smooth in variation from 10 Hz to 100 kHz; and constant in sensitivity within 1 dB to 35 kHz. The transducer is stable in temperature within 1 dB from 3 to 30°C over a frequency range of 10 Hz to 100 kHz; and in Hydrostatic pressure to 500 psig (3447 kPa) within 1 dB from 10 Hz to 60 kHz and within 2 dB from 60 kHz to 100 kHz. The transducer remains stable within Hydrostatic pressure and 1000 psig (6895 kPa) within 1.5 dB from 10 Hz to 60 kHz.

The transducer is omnidirectional within 1 dB in the XY (horizontal) plane from 10 Hz to 80 kHz.

FIG. 3 shows a typical directivity pattern for 60 kHz in the XY (horizontal) plane.

While the transducer is described as a sensing transducer it may as well be used as a sound source.

The transducer is also stable within ± 1 dB in the XY (horizontal) plane within hydrostatic pressure to 1000 psig (6895 kPa).

For the characteristics described the cylinder 1 has the best outside diameter of between 1.27 and 1.58 cm. The diaphragms 3 which control the broadband response of the transducer may be made of aluminum oxide, beryllium, beryllium oxide or titanium.

Obviously many modifications and variations of the present invention are possible in the light of the above teachings. It is therefore to be understood that within the scope of the appended claims, the invention may be practiced otherwise than as specifically described.

What is claimed and desired to be secured by letters patent of the United States is:

1. An electroacoustic transducer which comprises, a circumferentially polarized piezoelectric cylinder, a longitudinally polarized piezoelectric cylinder sealingly capped by two concentric imperforate diaphragms, and isolation means sealingly mounting said longitudinally polarized cylinder and diaphragms concentrically within said circumferentially polarized cylinder, said isolation means cooperating only radially between said diaphragms and the inner ends of said circumferentially polarized cylinder.

2. The electroacoustic transducer of claim 1 wherein, said diaphragms have a radius less than the inner radius of said circumferentially polarized cylinder and said isolation means are O-rings mounted on the rims of said diaphragms.

* * * * *